May 10, 1932. C. A. ALBRECHT 1,857,342
HEDGE CUTTER
Filed March 12, 1930 2 Sheets-Sheet 2

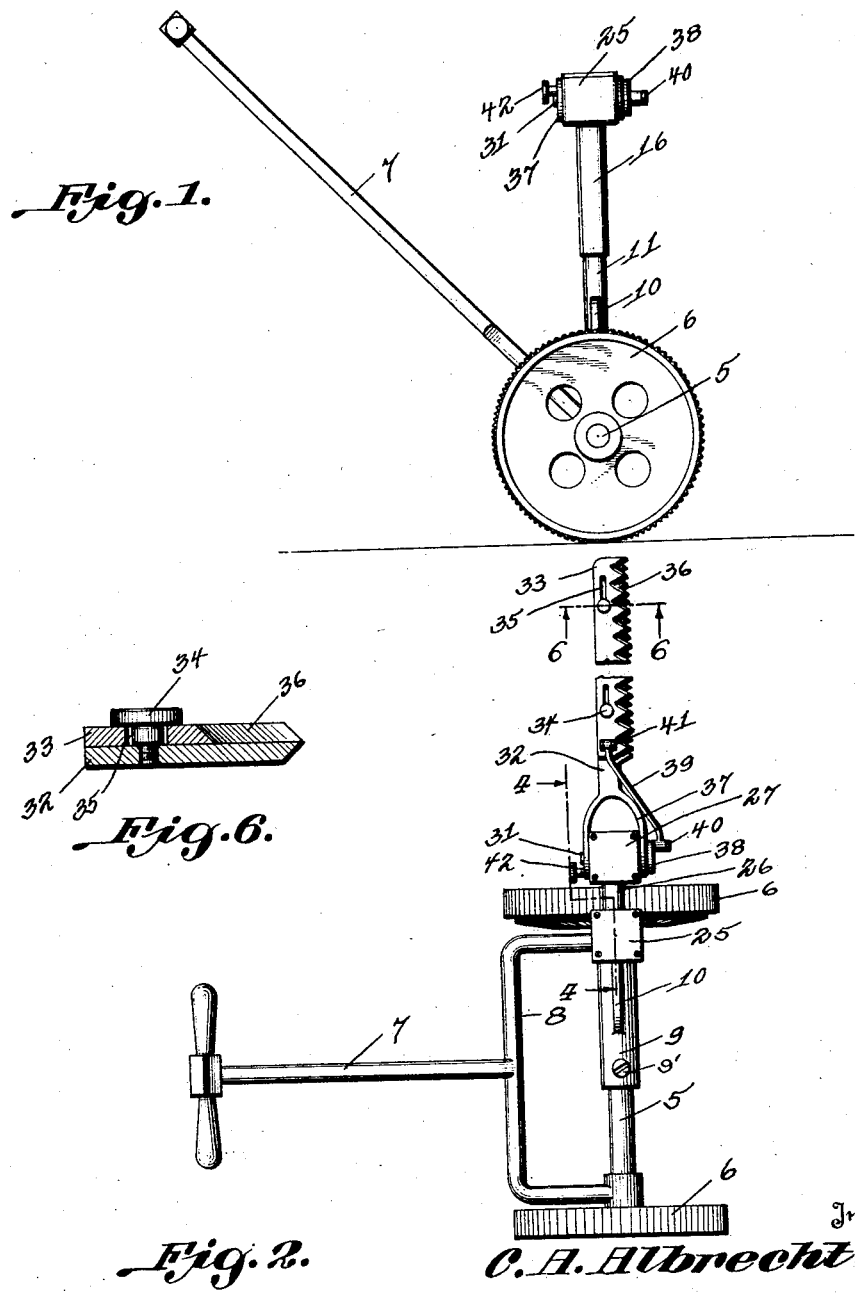

C. A. Albrecht, Inventor

Patented May 10, 1932

1,857,342

UNITED STATES PATENT OFFICE

CHARLES A. ALBRECHT, OF EAST CHICAGO, INDIANA

HEDGE CUTTER

Application filed March 12, 1930. Serial No. 435,261.

My invention relates to a hedge cutter and has for its object to provide a cutter adjustably mounted on a wheeled carriage and operable through movement of the carriage wheels to cut the hedge as the carriage is moved along the side of the hedge.

A further object of the invention is to provide a machine of the above-mentioned character in which the cutter is mounted so as to be readily adjustable to cut the side or top of the hedge.

Another object of the invention is to provide a machine of the above-mentioned character which is simple and durable in construction, reliable and efficient in operation and inexpensive to manufacture.

Other objects and advantages of the invention will be apparent during the course of the following description.

Figure 3:
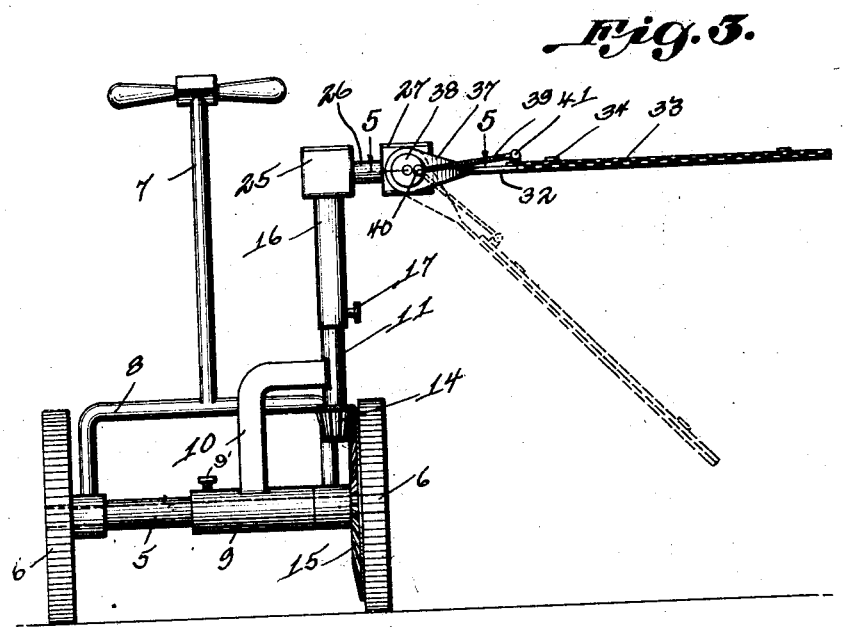
Figures 4, 5:
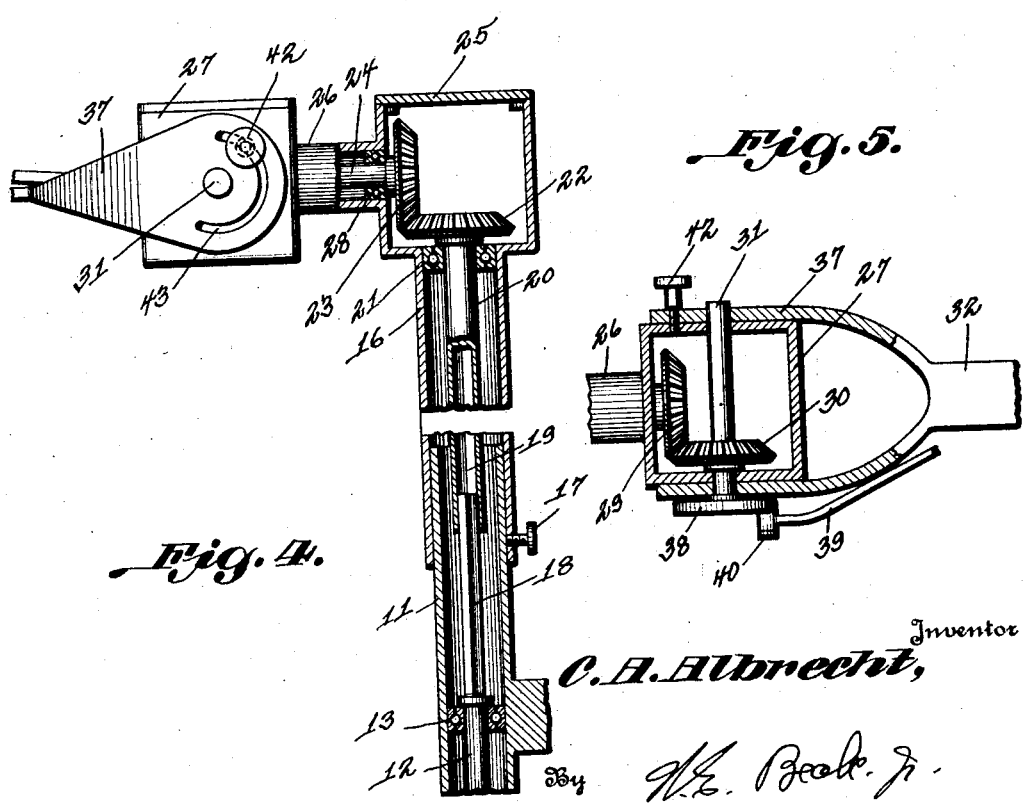

In the accompanying drawings, forming a part of this specification and in which like numerals are employed to designate like parts throughout the same, Fig. 1 is a side elevation view of the machine, Fig. 2 is a top plan view of the same, Fig. 3 is a front elevation view of the same, Fig. 4 is an enlarged fragmentary sectional view of the drive mechanism, Fig. 5 is a horizontal sectional view taken on lines 5—5 of Fig. 3 and, Fig. 6 is a transverse sectional view taken on lines 6—6 of Fig. 2.

In the drawings, wherein for the purpose of illustration, I have shown a preferred embodiment of my invention, a carriage is shown consisting of an axle 5 having wheels 6 journaled on the ends thereof. The carriage is pushed along the ground by means of the handle 7 connected to the axle 5 by means of the yoke 8. The yoke may be secured to the axle by soldering the parts together or otherwise providing a permanent connection, or if preferred the axle and yoke may be cast as a unit. A sleeve 9 is fixedly mounted on the axle 5 in any suitable manner, such as by means of a set screw 9', and extending upwardly from the sleeve is an arm 10, the upper end of which is bent at right angles and extends towards one of the wheels 6. Connected to the free end of the arm 10 is a vertical tube 11 in which the shaft 12 is axially disposed being mounted in the bearing 13 within the tube. Attached to the lower end of the shaft 12 is a beveled gear 14 which meshes with the annular beveled gear ring 15 attached to the inner face of one of the wheels 6. Telescopically mounted on the upper end of the tube 11 is a tube 16 which is held in its adjusted position on the tube 11 by the set screw 17 mounted in the lower end of the tube 16. The upper end of the shaft 12 is square, as at 18, adapted to fit in the square bore 19 of the shaft 20 which is mounted in the bearing 21 within the tube 16. Attached to the upper end of the shaft 20 is a beveled gear 22 which meshes with the beveled gear 23 mounted on the end of the horizontal shaft 24. The gears 22 and 23 are inclosed in the square housing 25 formed integral with the upper end of the tube 16 and extending from one side of the housing is a tubular extension 26 which connects with the square housing 27. The shaft 24 extends through the tubular extension 26 being mounted in bearings 28 in each end of the extension and projects into the housing 27. A beveled gear 29 is mounted on the end of the shaft 24 which meshes with the beveled gear 30 fixedly mounted on the shaft 31 extending horizontally through the housing 27.

The cutter consists of a stationary cutter bar 32 and a movable cutter bar 33 connected with the bar 32 by studs 34 which extend through longitudinal slots 35 in the bar 33 and guide the movement of the latter. The corresponding edges of the bars 32 and 33 are provided with teeth 36 the edges of which are sharpened. The cutter bar 32 at one end has a yoke 37 which straddles the housing 27 and has its ends pivotally mounted on the shaft 31 which projects beyond the sides of the housing. A crank 38 is fixedly mounted on one end of the shaft 31 and is connected with the cutter bar 33, by means of the connecting rod 39 which has one end connected with the crank pin 40 of the crank and its opposite end pivotally connected with the cutter bar, as at 41. Thus, it is seen the cutter is readily adjustable to assume either a horizontal or vertical position with respect to the ground and is held in its adjusted position by the set screw 42 which extends through the arcuate slot 43 in one end of the yoke 37 and is screwed into the side of the housing.

In operation, it will be seen that by pushing the carriage along side of the hedge to be cut, the rotation of the wheels 6 impart a rotary movement to the shaft 12 through the gear ring 15 and beveled gear 14 and in turn the shaft 12 rotates the shaft 20 which is connected by gears with the crank 38. The crank is connected with the movable cutter bar by the connecting rod 39 which imparts a reciprocating movement to the movable cutter bar when the crank is rotated. The cutter may be disposed at any distance from the ground depending on the height of the hedge to be cut, through adjustment of the tube 16 on the tube 11 and the cutter may be also moved from a horizontal position to a vertical position, through adjustment of the set screw 42, or if desired may be disposed at any angle with respect to the ground.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A device of the character described comprising a wheeled carriage, including an axle, a handle, a yoke connecting the handle to the axle, a sleeve fixedly secured to the axle, a telescopic support rising from the sleeve, a cutter adjustably connected with the upper end of said support and means for actuating said cutter.

2. A device of the character described comprising a wheeled carriage, including an axle, a handle, a yoke connecting the handle to the axle, a sleeve fixedly secured to the axle, a telescopic support rising from the sleeve, a cutter adjustably connected with the upper end of said support, a drive shaft disposed in said support having operative connection with the wheel of said carriage, and means establishing connection between said shaft and the cutter for actuating the latter.

3. A device of the character described comprising a wheeled carriage, including an axle, a handle, a yoke connecting the handle to the axle, a sleeve fixedly secured to the axle, a telescopic support rising from the sleeve a reciprocating cutter adjustably mounted at the upper end of said support, a drive shaft disposed in said tubular support, a ring gear mounted on one of the wheels of said carriage, a beveled gear mounted on the lower end of said drive shaft adapted to mesh with said ring gear, a crank for actuating said reciprocating cutter, and gear mechanism establishing connection between said drive shaft and crank.

4. A device of the character described comprising a wheeled carriage, a telescopic tubular support mounted on said carriage, a gear box at the upper end of the support having a shaft journalled to its sides with the ends of the shaft projecting from the box, a stationary cutter bar having a yoke at its inner end pivotally supported on the ends of said shaft, means for securing the stationary cutter bar in vertically adjusted position, a reciprocating cutter bar mounted on said stationary cutter bar, a crank operatively connected with one end of said shaft for actuating said reciprocating cutter bar and drive means for operating said shaft.

5. A device of the character described comprising a wheeled carriage including an axle, a movable handle and a cutter support, said handle and cutter support being attached to the axle for movement as a unit, and a cutter mechanism carried by said cutter support.

6. A device of the character described comprising a wheeled carriage including an axle, a handle extending therefrom, a sleeve carried by the axle, cooperating means between the axle and sleeve for securing the sleeve to the axle, a cutter support extending from the sleeve, a cutter mechanism carried thereby and an operating connection between the wheels of the carriage and said cutter mechanism.

In testimony whereof I affix my signature.

CHARLES A. ALBRECHT.